United States Patent [19]

Minnen

[11] 4,263,729
[45] Apr. 28, 1981

[54] DEVICE FOR SCRAPING ICE AND SNOW, PARTICULARLY FOR MOTOR VEHICLES

[76] Inventor: Eugène Minnen, 35 rue de la Deportation, Tubize, Belgium

[21] Appl. No.: 65,079

[22] Filed: Aug. 9, 1979

[30] Foreign Application Priority Data

| Aug. 9, 1978 | [BE] | Belgium | 869623 |
| Apr. 12, 1979 | [BE] | Belgium | 875520 |
| Apr. 12, 1979 | [BE] | Belgium | 875521 |
| Jul. 19, 1979 | [BE] | Belgium | 196375 |

[51] Int. Cl.³ .............................................. E01H 5/04
[52] U.S. Cl. ................................................. 37/42 VL
[58] Field of Search .................... 37/41, 42 R, 42 VL, 37/50; 280/160

[56] References Cited

U.S. PATENT DOCUMENTS

| 1,805,933 | 5/1931 | Victor | 37/42 VL |
| 2,211,277 | 8/1940 | Mere | 37/42 VL |
| 2,234,645 | 3/1941 | Hetzelt | 37/42 VL |
| 2,290,060 | 7/1942 | Massey | 37/42 VL |
| 2,994,896 | 8/1961 | Lopes | 37/42 VL X |
| 3,086,303 | 4/1963 | Weeks | 37/42 VL |

FOREIGN PATENT DOCUMENTS

| 2004447 | 8/1971 | Fed. Rep. of Germany | 37/42 VL |
| 2138183 | 2/1973 | Fed. Rep. of Germany | 37/42 VL |

*Primary Examiner*—E. H. Eickholt
*Attorney, Agent, or Firm*—Scully, Scott, Murphy & Presser

[57] ABSTRACT

There is described a scraping device the control means of which comprise an electric motor fastened to said fixed part and so arranged as to rotate a drive wheel driving a cable, chain or similar which is connected with the one end thereof to the movable arm free end, in the direction for raising said movable arm against the spring force, a housing for storing said cable, chain or similar in the movable arm upper position being provided upstream of the drive wheel, and an electric device for locking and releasing said movable arm, as well as electric connections connecting said electric motor and electric locking and releasing device to the vehicle driver positions.

15 Claims, 4 Drawing Figures

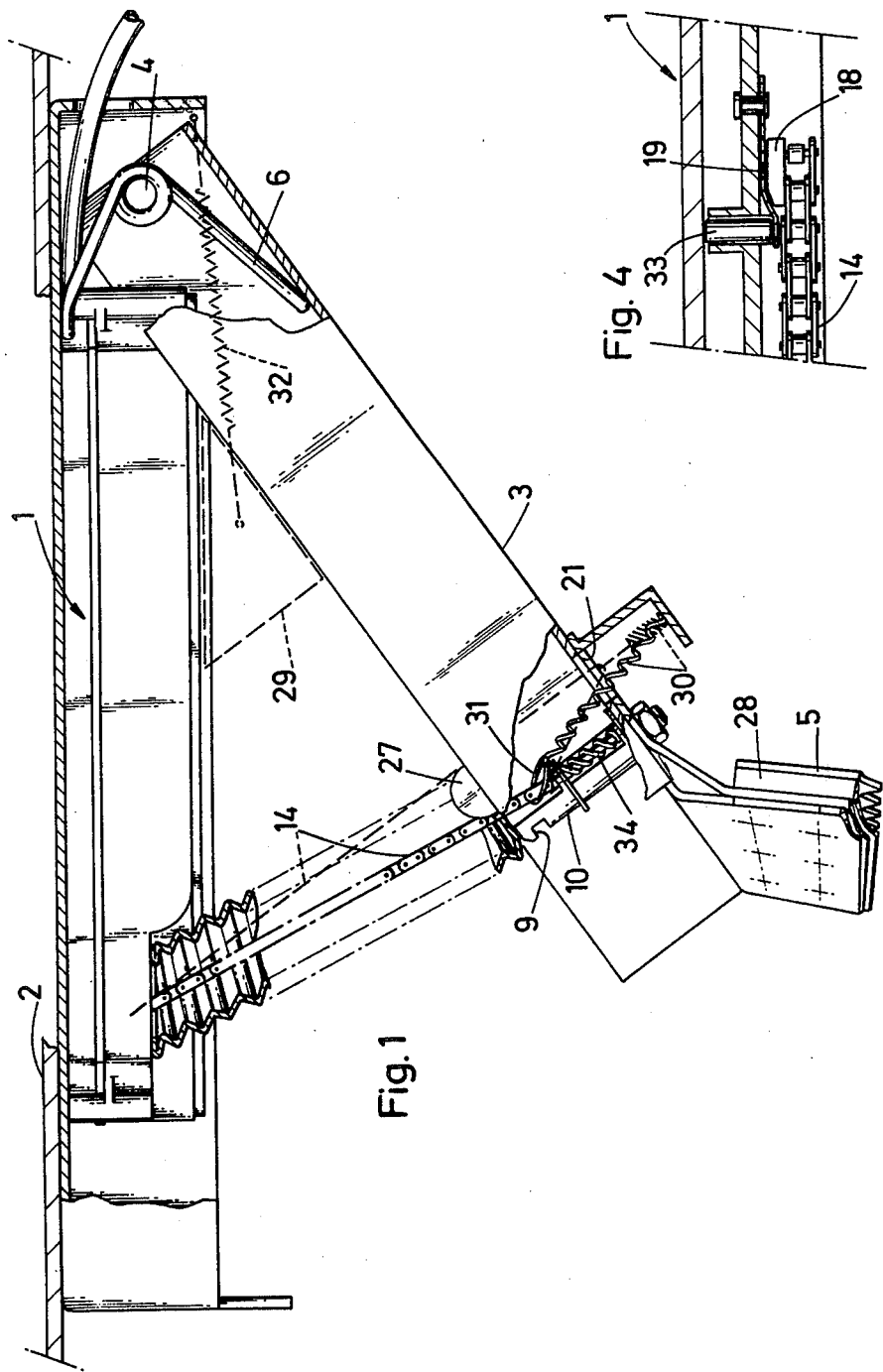

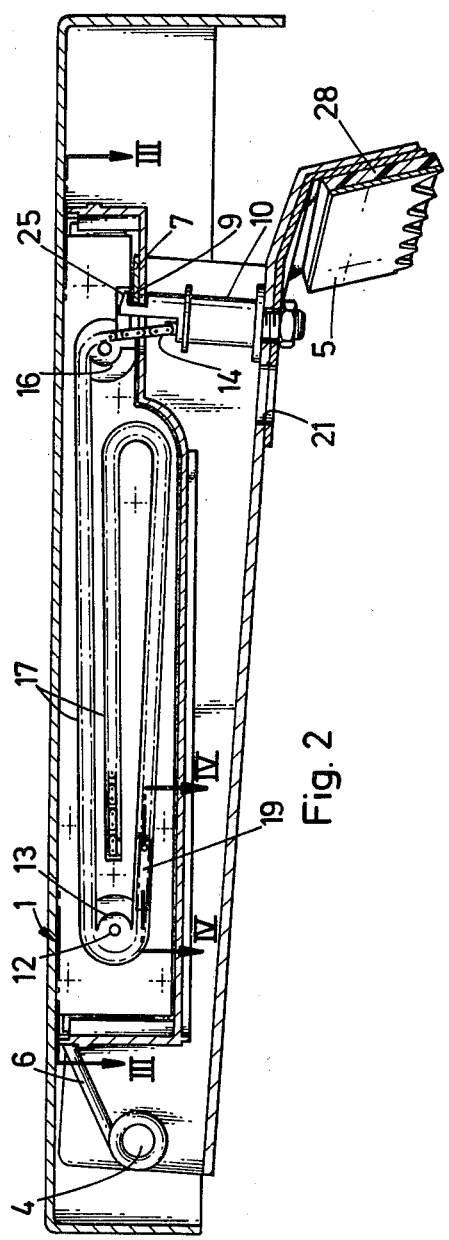
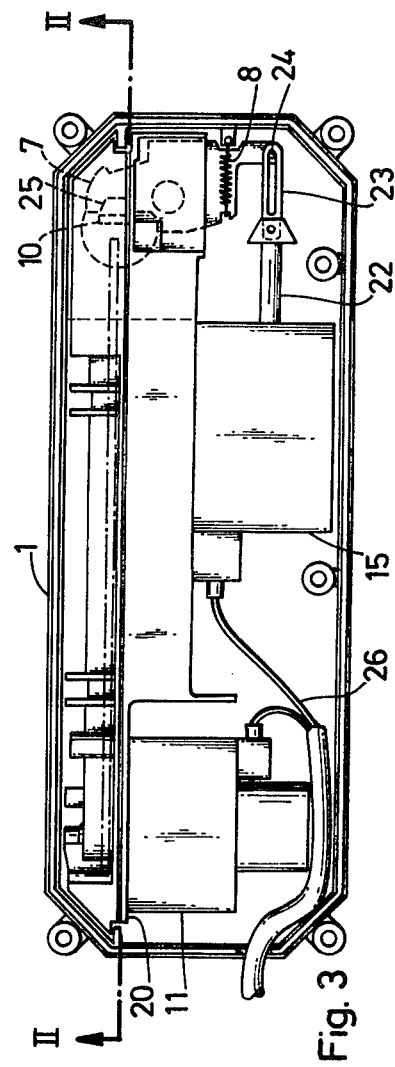

DEVICE FOR SCRAPING ICE AND SNOW, PARTICULARLY FOR MOTOR VEHICLES

This invention relates to a device for scraping ice and snow, particularly for motor vehicles, comprising a fixed part integral with the vehicle body bottom, a movable arm connected with the one end thereof to said fixed part and swingable downwards, a comb arranged at the movable arm free end and engaging the ice or snow in front of a vehicle wheel in the lower position of said movable arm, a spring connecting the fixed part and the movable arm and acting on said arm to swing same downwards, as well as control means for the movable arm with means for locking said movable arm in the upper position thereof, means for releasing the locked movable arm and a drive device for returning said movable arm to the upper position thereof.

There are already known for quite some time devices for scraping ice and snow, to be arranged in front of the driving wheels of motor vehicles; most said devices comprise a movable arm provided with a member for scraping away the ice or snow, said arm being operated to bring same to a lower position against the action of a return spring and through either rodding or cylinder-and-piston arrangements, or else through cables which are connected to the control position along a very long and intricate path.

A device as defined above is known from U.S. Pat. No. 1,636,145. Said device even if does not have any more the drawback of having to oppose the force of the spring to lower said movable arm and comb to the lower position thereof, still has the drawback of requiring a mechanical transmission to the control position. Consequently, to raise the movable arm, the driver has to operate a lever with a force strong enough to oppose the compression spring which pushes the movable arm downwards, which may be dangerous in that case where the vehicle is already running at some speed as the driver then only has but one hand on the steering-wheel.

This invention has for object to avoid the above-defined drawbacks and to provide a device for scraping ice and snow which is completely devoid of any mechanical transmission up to the driver position in the vehicle.

According to the invention, in a device as defined above, the control means comprise an electric motor fastened to said fixed part and so arranged as to rotate a drive wheel driving a cable, chain or similar which is connected with the one end thereof to the movable arm free end, in the direction for raising said movable arm against the spring force, a housing for storing said cable, chain or similar in the movable arm upper position being provided upstream of the drive wheel, and an electric device for locking and releasing said movable arm, as well as electric connections connecting said electric motor and electric locking and releasing device to the vehicle driver position.

In an advantageous embodiment of the invention, the storage housing is comprised of a guide groove provided inside the electric motor support, the drive wheel shaft as well as a counter-shaft being provided inside said groove.

In a particular embodiment of the invention, a stop member for the free end of the cable, chain or similar is provided exactly upstream of the drive wheel.

In an advantageous embodiment, the electric locking and releasing device comprises a swinging pawl which is engaged under the action of a return spring into the notch of an appendage provided on the movable arm upper surface, in the upper position of said movable arm, and a two-position electro-magnet which in the one position thereof, releases the pawl from said notch against the return spring action, and in the other position thereof, releases the pawl which is returned to the initial position thereof by said return spring.

In another embodiment of the invention, in the driver position is provided a toggle-switch which in the one contact position thereof, energizes the electric motor with a very short electric pulse to thus release the pawl from the pull exerted by the movable arm spring action, and energizes said electro-magnet to bring same to the position for the release of the pawl from said notch, said toggle-switch returning automatically to the center position thereof when the toggle-lever is released, which lets the movable arm go down under the spring action, while the toggle-switch in the other contact position thereof, energizes the electro-magnet in such a way as to bring same to the locking position, as well as the electric motor which returns said cable, chain or similar inside said housing.

Other details and features of the invention will stand out from the description given below, by way of non limitative example and with reference to the accompanying drawings, in which:

FIG. 1 is a side view with parts broken away of a complete device according to the invention, in the lower position.

FIG. 2 is a view along line II—II of the device as shown in FIG. 3 in the upper position.

FIG. 3 is a cross-section view along line III—III of FIG. 2.

FIG. 4 is a cross-section view, on a larger scale, along line IV—IV of FIG. 2.

In the various figures the same reference numerals pertain to similar elements.

The device according to the invention as shown in the accompanying drawings, comprises a fixed part in the form of a housing 1 integral with body bottom portion 2 of the vehicle, a movable arm 3 connected with the one end thereof to the fixed part, through a shaft 4 about which movable arm 3 is swingable, a comb 5 arranged on the free end of movable arm 3 and which is to engage the ice or snow in front of the driving wheels of the vehicle, in the lower position of the movable arm, and a torsion-type spring 6 which is wound about shaft 4 and acts to move movable arm 3 away from housing 1.

In the position as shown in FIG. 2, the movable arm lies in the upper position where it is locked through a pawl 7 which is swingable and may enter under the action of a spring 8, a notch 9 provided on an appendage 10 provided on the top surface of mable arm 3, adjacent the free end thereof.

The means for controlling the ice- and snow-scraping device according to the invention comprise as it appears from the figures, an electric motor 11 fastened inside housing 1 on a support 20 and connected to the shaft 12 of a chain wheel 13 which can drive a chain 14 which is connected with the one end thereof to movable arm 3, and an electric locking device which is comprised of a two-position electro-magnet 15 connected to pawl 7.

Chain wheel 13 is driven by electric motor 11 with such a rotation direction that the meshing chain returns movable arm 3 to the upper position, that is thus against the action of spring 6.

Between chain wheel 13 and that chain end fastened to the free end of movable arm 3 is provided reversing means, for instance a reversing wheel 16 which lies above the movable arm free end. That end of chain 14 opposite to the one connected to movable arm 3 is free and in the movable arm upper position, it meshes with chain wheel 13 inside a storage housing or recess lying upstream of said wheel. Said storage recess may be comprised of a guide groove 17 provided inside electric motor support 20, and which after connecting reversing wheel 16 and chain wheel 13, extends over a length which is at least longer than the spacing between the lower and upper position of movable arm 3. There should indeed be taken into account possible depressions in the ground which might increase the spacing between the movable arm in lower position and the fixed part.

However, to prevent the chain free end being driven beyond chain wheel 13, for example due to the inertia movement of the motor driving said wheel 13, a chain stop means has been provided directly upstream of said chain wheel 13. For example it is possible to provide on the last chain link a lug 18 with such a size that it does not prevent entering the chain by sliding inside groove 17 during the assembly of said device, as well as a metal leaf 19 which is fastened in flat position on one surface of groove 17 directly upstream of wheel 13. That end facing wheel 13 of said leaf 19 may be raised after introducing chain 14, by means of a point 33 passing through the support wall. At the interface between support 20 and housing 1, said point 33 will be pushed inside groove 17 and form together with leaf 19 a slanting plane which can brake and lock said lug 18.

Movable arm 3 is provided on the side of the free end thereof with a second store 21 for those cases where a possible excess of chain length has been unwound from housing 1 during the movement of said movable arm to the lower position. The chain length excess is automatically stored inside said store 21 which is comprised in this case of a simple opening provided in movable arm 3 adjacent the free end thereof and of a container provided on the movable arm lower surface. Means for automatically feeding said chain length excess to said opening may simply be comprised of a spring 30 connected to said container bottom and to a ring 31 inside which can slide the chain loop formed by the length excess, said spring 30 causing said loop to enter passage opening 21 (see FIG. 1, dash-and-dot outline).

During the raising of said movable arm, after latching of pawl 7 inside notch 9, if the electric motor is not stopped fast enough, there may occur a sudden pull on chain 14 with a danger of breaking same. To avoid such a drawback, there has been provided between appendage 10 and movable arm 3, a coil spring 34 to absorb the resulting impact.

Said two-position electro-magnet 15 is fastened to support 20 and it is connected to said pawl through an arm 22 which is integral therewith and which is provided with a stud-hole 23 inside which is slidable a projection 24 provided on pawl 7. Under the action of spring 8, the projection 24 is positioned at that end of stud-hole 23 farthest away from electro-magnet 15 (see FIG. 3). In the one electro-magnet position said projection is carried along by arm 22 in the direction of the electro-magnet against the action of spring 8. In this position, said pawl is released from notch 9. In the other electro-magnet position, said arm 22 and stud-hole 23 are returned to the original position thereof and spring 8 simultaneously returns pawl 7 in the original position thereof, the so-called locked position.

However in said latter position, the pawl may still be swung under the action of a slanting side 25 provided on the top portion of appendage 10 during the raising of movable arm 3. During said swinging, the projection 24 slides inside stud-hole 23 without acting on electro-magnet 15.

Electric motor 11 and electro-magnet 15 are connected to the vehicle driver position through conductors 26. In the driver position is provided an electric switch (not shown), for instance a toggle-switch, which in one contact position thereof feeds to said electric motor but one short electric pulse while so energizing the electro-magnet as to bring same to that position where pawl 7 is released from notch 9. As electro-magnet 15 is advantageously of low power, due to the electric pulse fed to the electric motor the chain is pulled backwards for a very short time during which said chain releases said pawl and consequently the electro-magnet of the downwards force of spring 6. Such release is enough to let said electro-magnet swing the pawl to the unlatched position. The switch automatically returns to the neutral or center position when the toggle-lever is released, which lets movable arm 3 go down under the action of spring 6. In the other contact position of said switch, the electro-magnet is so energized as to bring same and said pawl to the unlocking position thereof while electric motor 11 is energized to drive chain 14 inside storage groove 17 until movable arm 3 abuts said fixed part. At this time, said pawl 7 first pushed by slanting side 25 of appendage 10 has been engaged into notch 9 thereof.

Said movable arm can have a U-shaped cross-section which in the raised position, will surround housing 1 receiving the control means for said movable arm. The U legs are directed upwards and are each provided with a projection 27 which is so arranged as to have in the upper position of movable arm 3 but said projections engaging a fixed device part, which makes it easier to clean away the snow which might gather between movable arm 3 and fixed part 1 and consequently prevent the latching. As soon as the projections 27 are free, the latching becomes possible, without further cleaning. On the other hand, the projection height is such that as said projections engage the fixed part, the latching of appendage 10 occurs.

Between comb 5 and movable arm 3 may be arranged scraper 28 comprised of a thick strip of some flexible material of high strength, such as for instance hard rubber. The tips of the comb teeth are so arranged as to extend beyond scraper 28 but with a limited height which corresponds approximately to the thickness of the ice layer. Such an arrangement is particularly advantageous in those countries where there is little snow but mostly ice-formations and where the road surface should not be damaged.

In that case where the snow or ice layer cannot be broken-up by the single operation of comb 5 and spring 6, it is possible, after removing the load and occupants fromthe vehicle, to arrange between fixed part 1 and said arm 3, a removable wedge 29 from flexible material having a high strength, for example from hard rubber (shown in dot-and-dash lines in FIG. 1), said wedge being for example fastened with a brace-rod 32 to said fixed part, then to load the vehicule again, which allows increasing correspondingly the load applied to movable arm 3.

It must be understood that the invention is in no way limited to the above-described embodiments and that many changes can be brought therein without departing from the scope of the invention as defined by the appended claims.

It is clear for instance that it is possible to provide instead of a chain, a cable or any similar member.

It is also possible to wrap the chain with a bellow-like sheath from rubber material to prevent the snow entering the device.

I claim:

1. Device for scraping ice and snow, particularly for motor vehicles, comprising a fixed part integral with the vehicle body bottom, a movable arm connected with the one end thereof to said fixed part and swingable downwards, a comb arranged at the movable arm free end and engaging of said movable arm, a spring connecting the fixed part and the movable arm and acting on said arm to swing same downwards, as well as control means for the movable arm with means for locking said movable arm in the upper position thereof, means for releasing the locked movable arm and a drive device for returning said movable arm to the upper position thereof, in which the control means comprise an electric motor fastened to said fixed part and so arranged as to rotate a drive wheel driving a cable, chain or similar which is connected with the one end thereof to the movable arm free end, in the direction for raising said movable arm against the spring force, a housing for storing said cable, chain or similar in the movable arm upper position being provided upstream of the drive wheel, and an electric device for locking and releasing said movable arm, as well as electric connections connecting said electric motor and electric locking and releasing device to the vehicle driver position.

2. Device as defined in claim 1, in which the chain, cable or similar driven by the driving wheel passes over reversing means arranged above that movable arm free end to which is connected the one end of said cable, chain or similar, and the opposite end of said cable chain or similar is free inside the storage housing.

3. Device as defined in claim 2, in which the storage housing is comprised of a guide groove provided inside the electric motor support, the drive wheel shaft as well as a counter-shaft being provided inside said groove.

4. Device as defined in claim 3, in which the groove size upstream of the drive wheel is larger than the spacing between the lower position and the upper position of said movable arm.

5. Device as defined in claim 2, in which a stop member for the free end of the cable, chain or similar is provided exactly upstream of the drive wheel.

6. Device in chain 5, in which in the case of a chain, the last chain link is provided with a lug which does not prevent sliding of said chain inside said groove, and the stop member is a metal leaf lying in a slanting plane inside the groove, after the chain has been arranged inside said groove, said slanting plane slowing-down and stopping said lug on the last chain link.

7. Device as defined in claim 1, in which said movable arm is provided at the free end thereof with a second storage for the cable, chain or similar, second storage in which a possible excess length of the cable, chain or similar unwound during the movement of said movable arm to the lower position, is automatically stored.

8. Device as defined in claim 7, in which said second storage comprises a passageway provided through said movable arm, a resilient driving means connected adjacent that end connected to the movable arm of the cable, chain or similar, being so arranged as to feed automatically the loop formed by said excess length inside said second storage.

9. Device as defined in claim 1, in which the electric locking and releasing device comprises a swinging pawl which is engaged under the action of a return spring into the notch of an appendage provided on the movable arm upper surface, in the upper position of said movable arm, and a two-position electro-magnet which in the one position thereof, releases the pawl from said notch against the return spring action, and in the other position thereof, releases the pawl which is returned to the initial position thereof by said return spring.

10. Device as defined in claim 9, in which said appendage is provided on the top surface thereof, with a slanting side which is so arranged as to push the pawl against the action of the return spring as the movable arm is raised, and said pawl is connected to the electro-magnet by an arm which is fixedly connected to the electro-magnet and having a stud-hole inside which is slidable a pawl projection, the position of said projection inside said stud-hole being such that the projection is carried along by the connecting arm during the unlocking, while said projection sldes inside the stud-hole under the push of the movable arm appendage as said movable arm is raised.

11. Device as defined in claim 9, in which in the driver position is provided a toggle-switch which in the one contact position thereof, energizes the electric motor with a very short electric pulse to thus release the pawl from the pull exerted by the movable arm spring action, and energizes said electro-magnet to bring same to the position for the release of the pawl from said notch, said toggle-switch returning automatically to the center position thereof when the toggle-lever is released, which lets the movable arm go down under the spring action, while the toggle-switch in the other contact position thereof, energizes the electro-magnet in such a way as to bring same to the locking position, as well as the electric motor which returns said cable, chain or similar inside said housing.

12. Device as defined in claim 1, in which the movable arm is of U-shaped cross-section having legs which in the upper position, surrounds a housing receiving the control means for the movable arm, said legs being directed upwards and each provided at the top end thereof with a projection which is so arranged that in the upper position of said movable arm, only said projections contact another vehicle part.

13. Device as defined in claim 1, in which between said comb and movable arm is provided a scraper formed by a thick strip from a high-strength flexible material beyond which the comb tooth tips extend but over a predetermined height which corresponds at the most to the ice layer thickness.

14. Device as defined in claim 1, in which a removable wedge from high-strength flexible material can be arranged in that corner formed by the movable arm in the lower position thereof and said fixed part, when the vehicle has been unloaded as far as possible.

15. Device as defined in claim 9, in which between the movable arm appendage and said movable arm is provided a coil spring for absorbing the impact occurring as the movable arm is raised to the upper position thereof.

* * * * *